UNITED STATES PATENT OFFICE.

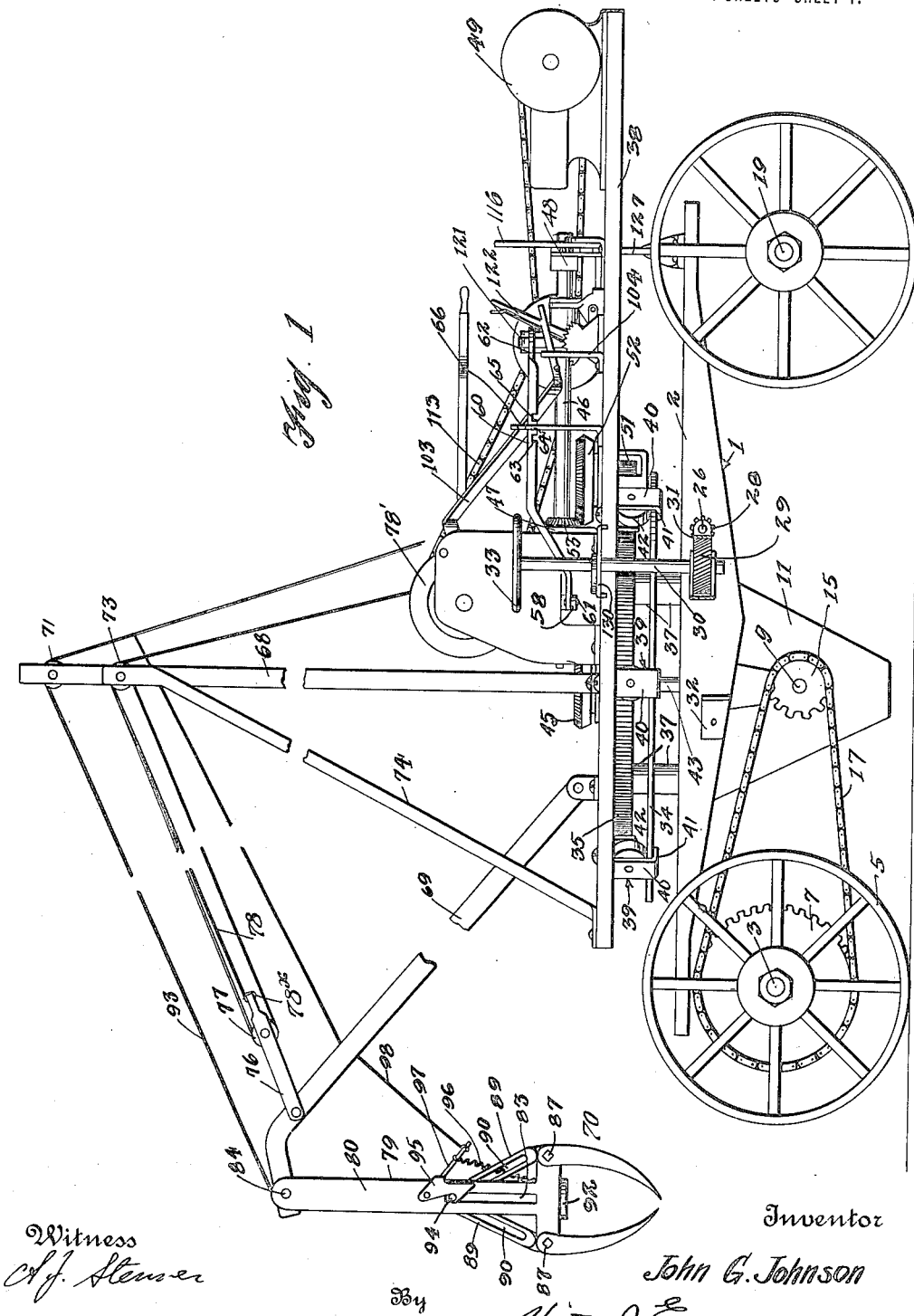

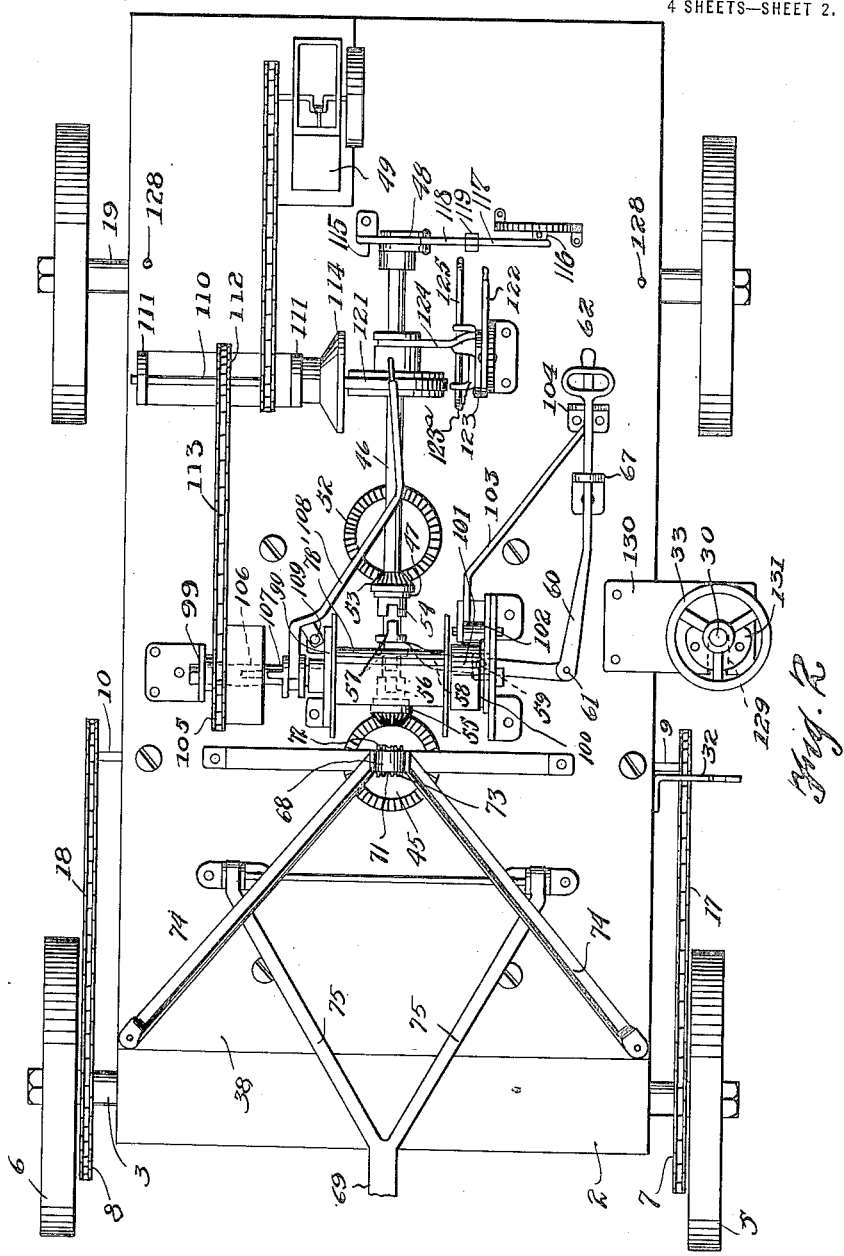

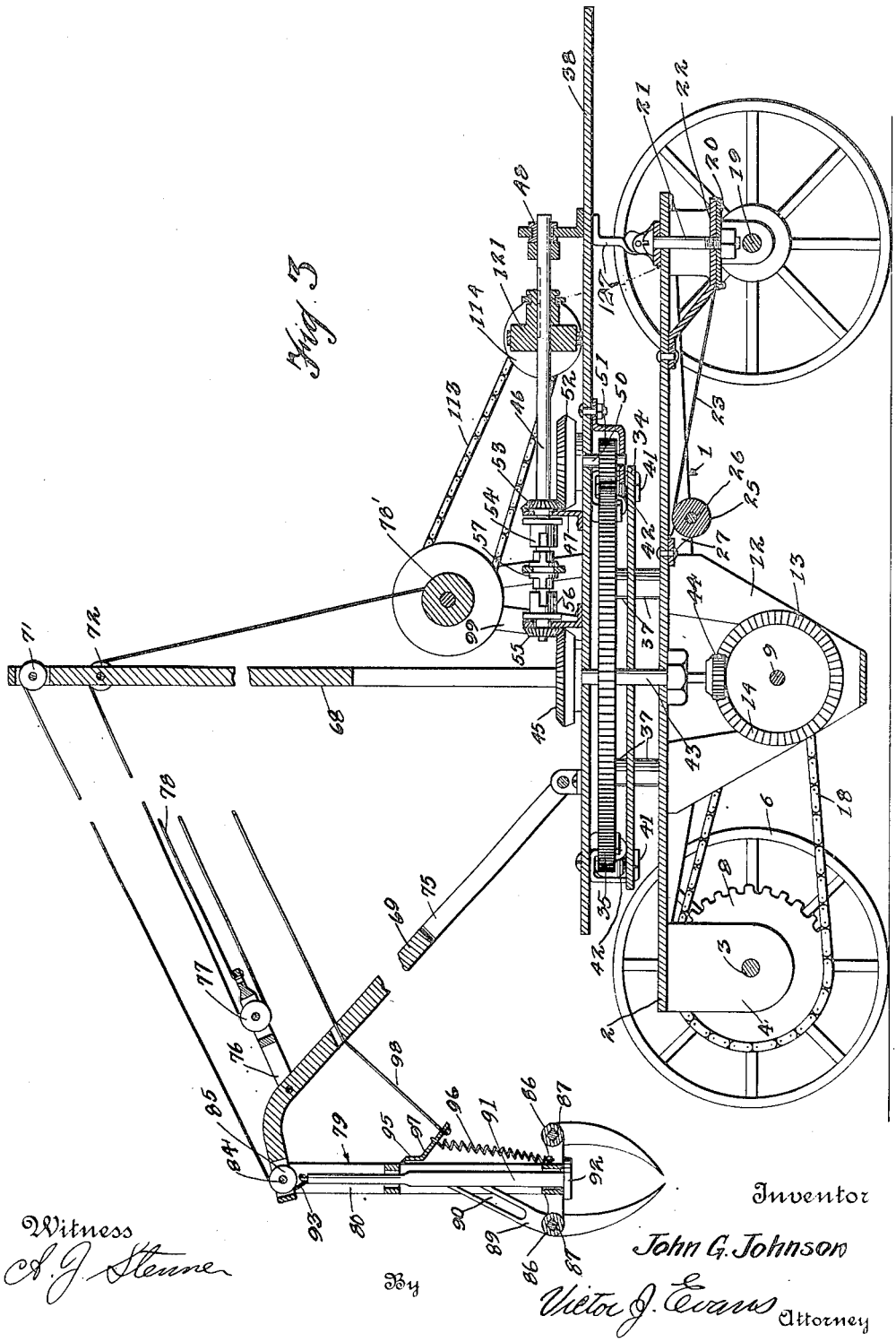

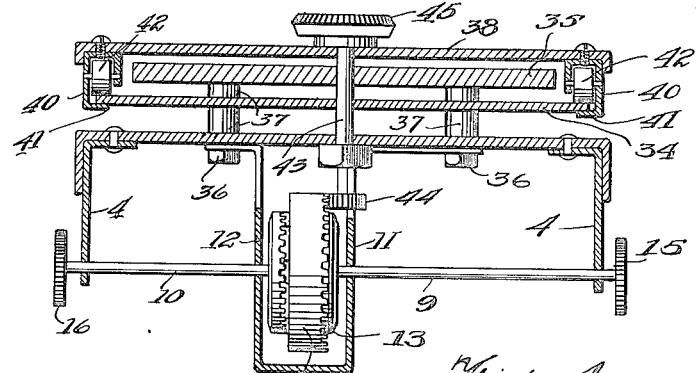
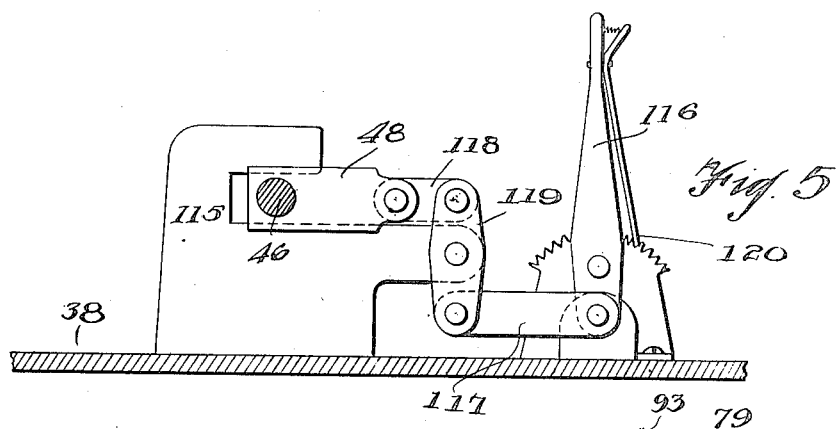
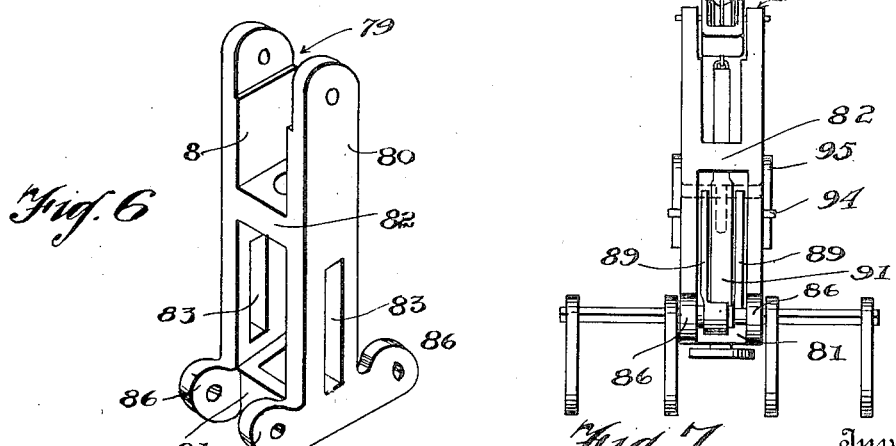
John G. Johnson, Inventor

JOHN G. JOHNSON, OF ST. LOUIS, MISSOURI.

HOISTING MACHINE.

1,417,386.   Specification of Letters Patent.   Patented May 23, 1922.

Application filed February 24, 1919. Serial No. 278,599.

*To all whom it may concern:*

Be it known that I, JOHN G. JOHNSON, a citizen of the United States, residing at St. Louis, State of Missouri, have invented new and useful Improvements in Hoisting Machines, of which the following is a specification.

This invention is an improved hoisting machine especially adapted for use as a hay stacker, but also adapted for other analogous purposes.

One object of the invention is to provide an improved machine of this character which is self-propelled and which can be rapidly moved along a road or from place to place for use as required.

Another object of the invention is to provide an improved machine of this kind embodying a truck, a platform pivotally mounted on the truck and on which the hoisting mechanism is mounted and also embodying a motor arranged on said platform and means driven by the motor for propelling the machine, for swinging the platform to one side or the other and also for operating the hoisting mechanism.

A further object of the invention is to provide an improved machine of this kind which is simple and compact and which can be readily controlled by a single operator.

With the above and other objects in view, the invention consists in the construction, combination and arrangement of devices hereinafter described and claimed.

In the accompanying drawings:

Figure 1 is a side elevation of a hoisting machine constructed and arranged in accordance with my invention.

Figure 2 is a plan of the same.

Figure 3 is a central longitudinal sectional view of the same.

Figure 4 is a detail transverse section of the same.

Figure 5 is a detail view showing the connections of the lever 116.

Figures 6 and 7 are detail views showing the construction of the fork.

The truck 1 on which the hoisting machine is mounted comprises a platform 2 having a rear axle shaft 3 arranged in suitable bearings 4 and provided with traction wheels 5, 6 which are respectively provided, on their inner sides, with sprocket wheels 7, 8. Transmission shafts 9, 10 are arranged in line with each other and mounted in suitable bearings 11, 12. The transmission shafts are connected together by differential gears 13 which include a driving gear 14. The transmission shafts are respectively provided at their outer ends with sprocket wheels 15, 16 which are respectively connected to the sprocket wheels 7, 8 by endless sprocket chains 17, 18.

The front axle 19 is mounted in bearings in a bolster 20. Said bolster is mounted on a pivot 21 and bears against an upper bolster 22. A chain 23 has its ends connected to the bolster 20 and said chain is coiled around a drum 25 which has a shaft 26, said shaft being mounted in bearings 27. A worm gear 28 is secured on the projecting end of said shaft and is engaged by a worm 29 on the lower end of a steering shaft 30, the said steering shaft being mounted in a bracket 31 which is pivotally mounted on the shaft 26 so that the steering shaft can be arranged in a vertical position or can be lowered. When lowered, the steering shaft bears on a supporting bracket 32 which projects from one side of the body or platform of the truck. At the upper end of the steering shaft is a steering wheel 33.

On the upper side of the truck is a fixed turn-table 34 above which is a fixed turning gear 35, the turn-table and the turning gear being secured by bolts 36 and spacer sleeves 37. The turning gear is of less diameter than the turn-table and is arranged concentric with respect thereto. The platform 38 which carries the hoisting mechanism, the motor and the driving connections is mounted for turning movement on the truck and is provided near one end with hangers 39 each of which has an outer arm 40 provided at the lower end with an inwardly extending flange 41 which engages under the turn-table. Rollers 42 are mounted in the hangers for rotation therein and bear on the upper side of the turn-table. A vertical shaft 43 is mounted in bearings in the truck body and platform 38 and passes through central openings in the turn-table and turning gear. Said shaft has a pinion 44 at its lower end which engages the driving gear 14 of the differential and is provided at its upper end with a beveled gear 45.

A driving shaft 46 is arranged longitudinally above the central portion of the platform 38, is mounted in bearings 47, 48 and is driven by a suitable motor which is also mounted on the platform 38 and is here shown conventionally illustrated and designated by the numeral 49. A vertical shaft 50 is mounted in bearings with which the platform 38 is provided and has a pinion 51 at its lower end which engages the turning gear. At the upper end of said shaft 50 is a beveled gear 52. A beveled gear 53 is loosely mounted on the driving shaft, engages the gear 52 and is provided with a clutch member 54. A beveled gear 55 is also loose on the driving shaft, engages the gear 45 at the upper end of the vertical shaft 43 and is provided with a clutch member 56 which is appropriately spaced from the clutch member 54. A shiftable clutch element 57 is splined on the driving shaft, is arranged between the clutch members 54, 56 and may be engaged with either of them. When said clutch member 57 is engaged with the clutch member 56, the vertical shaft 43 is driven and, by means of the connections herein described, causes the machine to be propelled and, hence, the machine can be readily moved from point to point, as desired. When the clutch member 57 is engaged with the member 54, the gear 53 is locked to the driving shaft and, hence, the gears 53, 52 turn the shaft 50 and the turning gear and the gear 51, hence cause the platform 38 to be pivotally turned or swung.

A shipper lever 58 is fulcrumed at 59 and has forked ends which engage in a groove of the clutch 57. The shipper lever, and hence said clutch, are operated by a link rod 60 which is pivoted to said lever, as at 61, and has a handle 62 at its free end. Said link rod has notches 63, 64, 65 on its lower side. Said link rod operates in a vertical slot 66 of a standard 67 and any one of its notches may be engaged with the standard, at the lower end of said slot, to cause said link rod to lock the clutch 57 either in engagement with the clutch 54 of the gear 53 or the clutch 56 of the gear 55 or out of engagement with both of said gear clutches. When the clutch 57 is engaged with the clutch 54, the shaft 50 is turned and, hence, the gears 51, 35 cause the platform to be turned. When the clutch 57 is engaged with the clutch 56, the shaft 43 is revolved and, hence, the machine is propelled. When the clutch 57 is out of engagement with both clutches 54, 56, the machine and the platform are at rest and the motor and shaft 46 may be employed for operating the hoisting mechanism hereinafter described and which is mounted on the rear end of the platform.

Said hoisting mechanism comprises a mast 68, a derrick arm 69 and a fork 70. The mast is secured on the platform and arranged above the shaft 43 and has a pulley 71 mounted in its upper end and a pair of pulleys 72, 73 mounted below the pulley 71. Braces 74 are provided for the mast. The derrick arm 69 is provided with a forked inner end portion 75. Adjacent to its upper end said arm 69 is equipped with a block 76 in which is a pulley 77. A hoisting cable 78 is attached at 78* and to the block, passes over the pulley 73, Figure 1, then around the pulley 77 and then over the pulley 72, Figure 3, and leads downwardly and is attached to a hoisting drum 78′.

The fork 70 has a frame 79 which is vertically arranged and comprises side members 80, a cross bar 81 connecting the members together at their lower ends and a cross bar 82 which connects said members 80 at a point a suitable distance from their lower ends. Each member 80 has a vertical slot 83. The upper end of said members are pivotally connected to the outer end of the derrick arm as at 84 and a pulley 85 is mounted on said pivot. The members 80 are provided at their lower ends with oppositely extending arms 86. Rock shafts 87 are mounted for partial rotation in bearing openings in said arms and are provided with downwardly extending fork teeth which are curved downwardly in opposite directions. Each rock shaft has a rock arm 89 arranged for movement in the frame 79 and provided with a vertical slot 90. A striker pin 91 is arranged for vertical movement in central openings in the cross bars 81, 82 and has an enlarged base 92 at its lower end which, when the fork is lowered onto the hay, grain, or the like, causes the striker pin to be moved upwardly relatively to the frame of the fork. A cord 93 is attached to the upper end of the striker pin, passes over the pulleys 85 and 71 and leads downwardly to the platform so that the striker pin can be manually drawn upwardly when this is desired. The rock arms 89 of the rock shafts 87 are arranged in crossed relation to each other and at opposite sides of the striker pin and said striker pin has a cross pin 94 which operates in the vertical slots 83 of the fork frame and also in the slots 90 of said rock arms 89. Hence, when the pin drops downwardly, the cross pin 94 causes the rock arms 89 to turn the rock shafts 87 in opposite directions to open the fork. When the striker pin is drawn upwardly by means of the cord 93, the rock arms move upwardly and turn the fork teeth of the respective rock shafts toward each other, thereby securely gripping the load. When the fork is thus locked, one end of the cross pin engages a pivotally mounted gravity acting dog 95 with which the fork frame is provided. A spring 96 may also be employed, to insure the locking movement of the dog and the dog has an arm 97 to which a trip cord 98 is attached, said trip cord being guided through an opening in the derrick arm and being here shown as connected to the cord 93 for the convenience of the operator.

The hoisting drum 78′ has its shaft mounted in bearings on a pair of standards 99 which are secured on the platform. The drum 78′ has a friction drum 100 at one end.

A friction band 101 passes around the drum, has one end secured, as at 102, and the free end of said friction band is pivotally connected to a brake lever 103. Said brake lever may be held at any desired adjustment by means of a rack standard 104. The brake thus provided permits the operator to control the operation of the drum when lowering the hoisting mechanism as will be understood. At the opposite end of the hoisting drum is a loose sprocket wheel 105 which has a clutch element 106. A clutch 107 is splined on the drum shaft and may be engaged with the clutch element 106 to lock said sprocket wheel to the drum shaft. A shipper lever 108 is provided to enable said clutch 107 to be operated, said shipper lever being here shown as fulcrumed on a standard 109.

A shaft 110 is arranged parallel with the drum shaft and at a suitable distance therefrom and is mounted in bearings 111. Said shaft has a sprocket wheel 112 which is connected by an endless sprocket chain 113 with the sprocket wheel 105 and at the inner end of said shaft is a friction disk 114.

The bearing 48 of the driving shaft 46 is shiftable to a slight extent in a suitable guide 115 and a lever 116 is provided for shifting said bearing and, hence, the corresponding end of said shaft, said lever being connected to said shiftable bearings by links 117, 118 and a rocking link 119. A segment 120 is provided which coacts with a dog to lock said lever and, hence, the shiftable bearing and the corresponding end of the shaft 46 in the desired adjusted position. A friction wheel 121 is splined and longitudinally movable on the shaft 46 and may be engaged with the friction disk 114 and may be shifted to either side of said disk to cause the shaft 46 to be turned in either direction, and thereby regulate the direction of movement of either the platform or the truck. A lever 122 is provided for shifting said friction wheel 121, said lever being connected by a link 123 to a slide 123ᵃ that carries a shipper arm 124 which engages a circumferential groove in the hub of said friction wheel 121. The slide 123ᵃ is shiftably mounted on a longitudinal guide rod 125, fixed on the platform 38.

All the controlling levers are arranged close together so that one operator can control all the movements and operations of the machine.

It will be understood that by turning the platform by the means hereinbefore described, the hoisting mechanism can be swung in any desired direction.

When the machine is being propelled, the platform is locked on the truck against turning movement by a bar 127 which is pivotally mounted on the front end of the truck and which, when raised and caused to bear under the platform 38, as shown in Figure 3, can be secured to the platform by means of pins 128, Figure 2. The steering post, when in vertical position, is held in a slot 129 of a bracket 130 which projects from one side of the platform, a hasp 131 being provided on said bracket for locking the steering post in such position.

While I have herein shown and described a preferred embodiment of my invention I would have it understood that changes may be made in the form, proportion and construction of the several parts without departing from the spirit of my invention and within the scope of the appended claims.

Having thus described my invention, I claim:

1. In a machine of the class described, a truck, a platform mounted on the truck for pivotal movement, hoisting means mounted on the platform, means to propel the truck, steering means for the truck including a bearing mounted for vertical pivotal movement and also including a steering post mounted in said bearing and, hence, arranged for vertical pivotal movement so that said steering post can be lowered out of the way of the platform when the latter is to be turned.

2. In a machine of the class described, a truck, a platform mounted on the truck for pivotal movement, hoisting means mounted on the platform, means to propel the truck, steering means for the truck including a bearing mounted for vertical pivotal movement and also including a steering post mounted in said bearing and, hence, arranged for vertical pivotal movement so that said steering post can be lowered out of the way of the platform when the latter is to be turned, the platform being provided with means to hold said steering post in upright position for use in steering the machine.

3. In a machine of the class described, a truck, a rotatable platform mounted on said truck, hoisting means mounted on the platform and including a derrick arm, a mast and a hoisting cable, a drum mounted on the platform and secured to said cable, means for rotating said drum, means to propel the truck and including a vertical shaft coincident with the pivot axis of the platform, a horizontal shaft journaled in suitable bearings upon the platform, a motor on the platform having a drive shaft, sprocket wheels secured to the horizontal shaft and the drive shaft, an endless chain connecting said sprocket wheels, a second horizontal shaft journaled in suitable bearings on the platform, and friction means to gear the first mentioned horizontal shaft to the last mentioned horizontal shaft and means to gear the last mentioned horizontal shaft with the vertical shaft.

In testimony whereof I affix my signature.

JOHN G. JOHNSON.